US010927280B2

(12) United States Patent
O'Brien et al.

(10) Patent No.: US 10,927,280 B2
(45) Date of Patent: Feb. 23, 2021

(54) METHODS OF AND SYSTEMS FOR CONTROLLING DUST

(71) Applicant: Ecolab USA Inc., St. Paul, MN (US)

(72) Inventors: Kevin O'Brien, Saint Charles, IL (US); Nicholas S. Ergang, Glen Ellyn, IL (US); Sankar Bhattacharja, Naperville, IL (US); Andrew Brinkmeier, Waxhaw, NC (US); John C. Cranfill, III, Lexington, KY (US); Shaun P. Lendrum, Paris, KY (US)

(73) Assignee: Ecolab USA Inc., St. Paul, MN (US)

( * ) Notice: Subject to any disclaimer, the term of this patent is extended or adjusted under 35 U.S.C. 154(b) by 72 days.

(21) Appl. No.: 15/343,501

(22) Filed: Nov. 4, 2016

(65) Prior Publication Data

US 2017/0130109 A1 May 11, 2017

Related U.S. Application Data

(60) Provisional application No. 62/252,081, filed on Nov. 6, 2015.

(51) Int. Cl.
| | |
|---|---|
| *B05D 1/02* | (2006.01) |
| *E21F 5/04* | (2006.01) |
| *E21F 5/06* | (2006.01) |
| *C09K 3/22* | (2006.01) |
| *E21F 5/18* | (2006.01) |
| *B05B 12/10* | (2006.01) |
| *B08B 17/00* | (2006.01) |
| *B05B 9/00* | (2006.01) |
| *B05B 12/12* | (2006.01) |
| *C09D 5/00* | (2006.01) |
| *G01N 13/02* | (2006.01) |

(52) U.S. Cl.
CPC ............... *C09K 3/22* (2013.01); *B05B 9/00* (2013.01); *B05B 12/10* (2013.01); *B05B 12/12* (2013.01); *B05D 1/02* (2013.01); *B08B 17/00* (2013.01); *C09D 5/00* (2013.01); *E21F 5/04* (2013.01); *E21F 5/06* (2013.01); *E21F 5/18* (2013.01); *G01N 13/02* (2013.01)

(58) Field of Classification Search
CPC ...... E21F 5/18; E21F 5/04; E21F 5/06; G01N 13/02; B05B 12/12; B05B 9/00; B05D 1/02; C09K 3/22

See application file for complete search history.

(56) References Cited

U.S. PATENT DOCUMENTS

| | | | | |
|---|---|---|---|---|
| 3,811,660 A | * | 5/1974 | Cole, Jr. ............... | E21F 5/00 169/15 |
| 3,954,662 A | * | 5/1976 | Salyer ................... | C09K 3/22 252/88.1 |
| 4,416,148 A | * | 11/1983 | Klus ..................... | G01N 13/02 374/142 |
| 4,428,984 A | * | 1/1984 | Shimizu ................ | C09K 3/22 252/88.1 |
| 4,812,532 A | | 3/1989 | Stolowitz | |
| 4,866,105 A | | 9/1989 | Batdorf | |
| 4,874,426 A | * | 10/1989 | Honda .................. | B41F 33/0054 73/64.48 |
| 5,439,608 A | * | 8/1995 | Kondrats ............... | C09K 3/22 134/38 |
| 6,040,406 A | | 3/2000 | Carrier et al. | |
| 6,206,958 B1 | | 3/2001 | Panzera et al. | |
| 6,482,883 B1 | | 11/2002 | Cuch et al. | |
| 7,612,022 B2 | | 11/2009 | Shpakoff et al. | |
| 8,632,133 B2 | * | 1/2014 | Chugh .................. | E21C 27/24 299/12 |
| 10,151,199 B2 | | 12/2018 | Kuiper | |
| 2003/0213069 A1 | * | 11/2003 | Tortorici ............... | D06F 39/004 8/158 |
| 2003/0213168 A1 | | 11/2003 | Hesse et al. | |
| 2008/0221005 A1 | | 9/2008 | Kaaret et al. | |
| 2009/0090890 A1 | | 4/2009 | Nguyen | |
| 2010/0209194 A1 | * | 8/2010 | Guite .................... | B09C 1/002 405/128.75 |

FOREIGN PATENT DOCUMENTS

| | | |
|---|---|---|
| CL | 200901970 A1 | 12/2009 |
| CL | 201000632 A1 | 2/2011 |
| CL | 201502269 A1 | 8/2016 |

(Continued)

OTHER PUBLICATIONS

Triton™ X-100 data sheet, retrieved from https://www.signnaaldrich.com/catalog/product/sial/x100?lang=en&region=US (Year: 2012).*
Kalman, Kenneth. "Precipitate flotation: Study of underlying mechanism" (1971). The Canadian Journal of Chemical Engineering, vol. 49 p. 626-631 (Year: 1971).*
SU909211A1 machine translation (Year: 1982).*
Israel Patent Office, International Search Report in International Patent Application No. PCT/US2016/060428, dated Feb. 15, 2017 (3 pp.).
Israel Patent Office, Written Opinion in International Patent Application No. PCT/US2016/060428, dated Feb. 15, 2017 (4 pp.).
Ecolab, "Preliminary Literature Search Report #10091," 40 pp. (Jan. 14, 2015).

(Continued)

*Primary Examiner* — Jose I Hernandez-Kenney
(74) *Attorney, Agent, or Firm* — Kagan Binder, PLLC

(57) ABSTRACT

Methods of and systems for dispensing dust suppressant are provided. The methods comprise forming an aqueous dispersion stream by delivering a surfactant composition to an aqueous liquid stream. The aqueous dispersion stream is mixed to form a dust suppressant. The dust suppressant is dispensed to a surface at a pressure sufficient to provide coverage of the surface. Surface tension of the dust suppressant is measured via a tensiometer, and the measurement is relayed to a controller. The forming of the aqueous dispersion stream is adjusted according to the measured surface tension relayed to the controller. The systems are configured to carry out one or more of the provided methods.

15 Claims, 4 Drawing Sheets

(56) References Cited

FOREIGN PATENT DOCUMENTS

| | | |
|---|---|---|
| CN | 1298903 A | 6/2001 |
| CN | 101392039 A | 3/2009 |
| CN | 101696636 A | 4/2010 |
| CN | 101906987 A | 12/2010 |
| CN | 101915116 A | 12/2010 |
| CN | 102353622 A | 2/2012 |
| CN | 102505956 A | 6/2012 |
| CN | 102505957 A | 6/2012 |
| CN | 103089291 A | 5/2013 |
| CN | 103266911 A | 8/2013 |
| CN | 103285692 A | 9/2013 |
| CN | 103291348 A | 9/2013 |
| CN | 103335924 A | 10/2013 |
| CN | 103571989 A | 2/2014 |
| CN | 103846285 A | 6/2014 |
| CN | 103977659 A | 8/2014 |
| DE | 19630441 A1 | 1/1998 |
| EA | 009260 B1 | 12/2007 |
| EP | 0000224 A1 | 1/1979 |
| EP | 0928813 A1 | 7/1999 |
| EP | 2206765 A1 | 7/2010 |
| JP | H07-216389 A | 8/1995 |
| JP | 2002-146390 A | 5/2002 |
| JP | 2011-001500 A | 1/2011 |
| JP | 2014-114469 A | 6/2014 |
| KR | 10-2010-0035834 | 4/2010 |
| SU | 909211 A1 | 2/1982 |
| SU | 909211 A1 * | 2/1982 |
| SU | 1476352 A1 | 4/1989 |
| WO | WO 00/00815 A1 | 1/2000 |
| WO | WO-0000815 A1 * | 1/2000 ............ G01N 13/02 |
| WO | WO 00/77161 A1 | 12/2000 |
| WO | WO 01/82986 A2 | 11/2001 |
| WO | WO 03/057815 A1 | 7/2003 |
| WO | WO 03/084670 A1 | 10/2003 |
| WO | WO 03/089108 A1 | 10/2003 |
| WO | WO 2004/010123 A1 | 1/2004 |
| WO | 2010045448 A1 | 4/2010 |
| WO | WO 2011/036029 A1 | 3/2011 |

OTHER PUBLICATIONS

Ecolab, "Literature Search Report #10091," 104 pp. (Feb. 19, 2015).

Benson et al., "Mercury control testing in a pulverized lignite-fired system," *Fuel Processing Technology*, vol. 90, pp. 1378-1387 (2009).

Bilden et al., "Evaluation and Treatment of Organic and Inorganic Deposition in the Midway Sunset Field, Kern County, California," *SPE 1990 California Regional Meeting* (Ventura Apr. 4-Apr. 6, 1990) *Proceedings*, SPE No. 20073, pp. 523-538 (1990).

Cantrell et al., "Status of a Tapered Element, Oscillating Microbalance-Based Continuous Respirable Coal Mine Dust Monitor," *Applied Occupational and Environmental Hygiene*, vol. 11, No. 7, pp. 624-629 (1996).

Chen et al., "Measurement and Analysis on Critical Surface Tension of Coal," *Meikuang Anquan*, vol. 43, No. 11, pp. 161-162, 167 (2012).

Cheng et al., "Experiment of Dust-Settling with Spraying Surfactants and Its Application in Fully Mechanized Caving Face," *Journal of Shandong University of Science and Technology (Natural Science)*, vol. 28, No. 4, pp. 77-81 (2009).

Copeland et al., "Dust suppression in iron ore processing plants," *Minerals & Metallurgical Processing*, vol. 22, No. 4, pp. 177-191 (2005).

Ding et al., "Experimental research on optimization and coal dust suppression performance of magnetized surfactant solution," *Procedia Engineering*, vol. 26, pp. 1314-1321 (2011).

Glover et al., "Respirable Airborne Dust Exposure Levels in the New South Wales Coal Mining Industry," *Applied Occupational and Environmental Hygiene*, vol. 12, No. 12, pp. 980-987 (1997).

Gulf Publishing Co., "Acidizing products and additives," *World Oil*, vol. 219, No. 11, pp. 109-116 (1998).

Gupta, "Need for pollution control measurements and related problems," *Journal of FACT Technical Society*, vol. 14, Nos. 1-2, pp. 52-56 (1981).

Harris, "Fracturing-Fluid Additives," *Journal of Petroleum Technology*, vol. 40, No. 10, pp. 1277-1279 (1988).

Hower et al., "Results of Air Quality Monitoring Studies of Petroleum Coke in the Los Angeles-Long Beach Harbor Area," *Proceedings of the Air & Waste Management Association's Annual Conference & Exhibition (93$^{rd}$)*, Salt Lake City, UT, USA, Jun. 18-22, 2000, pp. 253-266.

Ishchuk et al., "Methodological principles for the selection of effective compositions of liquids for prewetting of a coal face [in mining]," *Inst. Gorm. Dela, USSR, Bor'ba s Silikozom*, vol. 12, pp. 26-32 (1986).

Kilau, "The Influence of Sulfate Ion on the Coal-Wetting Performance of Anionic Surfactants," *Bur. Mines Rep. Invest.*, RI 9292, 34 pp. (1990).

Kilau et al., "Coal Wetting Ability of Surfactant Solutions and the Effect of Multivalent Anion Additives," *Colloids and Surfaces*, vol. 26, pp. 217-242 (1987).

Kim et al, "The Effect of Added Base on Coal Wetting Ability of Nonionic Surfactant Solutions Used for Dust Control," *The Mining Engineer London*, vol. 154, No. 399, pp. 151-155 (1994).

King, "Technical Coal Research—Coal Preparation: Reduction of fugitive dust from coal stockpiles," *Commission of the European Communities*, EUR 17162, 109 pp. (1997).

Kulabukhova et al., "Colloid-Chemical Properties of Monoalkyl- and Monoethoxyalkyl-Succinatosulfanates," *Colloid Journal of the USSR*, vol. 51, No. 3, pp. 509-512 (1989).

Lee et al., "Industrial Process: Practical Approach to a High-Purity Water Treatment System Design at a CD Manufacturing Plant," *Ultrapure Water®*, vol. 12, No. 4, pp. 21-22, 24-27 (1995).

Lu et al., "Coal mine dust monitoring and elements assaying," *China Occupational Safety and Health Management Sy*, No. 1, pp. 34-37 (2008)—Abstract Only.

Markowski, "Trace Element Concentration as a Function of Particle Size in Fly Ash from a Pulverized Coal Utility Boiler," *Environ. Sci. Technol.*, vol. 19, No. 9, pp. 796-804 (1985).

Martinez Fidalgo et al., "Technical prevention of dust in coal mines. Monitoring of silica," *Medicina y Seguridad del Trabajo*, vol. 31, No. 121, pp. 9-12 (1985).

Metrico et al., "The Role of Tension-Modifying Agents in the Control of Dust Caused During Pneumatic Drilling and Stowing," *Comm. of the Eur. Communities (EUR 4957 d,n)*, pp. 591-608 (1973).

Scholl et al., "Combustion and explosion parameters of dusts," *Inst. Explos. Sprengtech*, Bergbau-Versuchsstrechke, Fed. Rep. Ger., STF-Report, vol. 2, 99 pp. (1979).

Septier et al., "Charge composition without iron in an open-hearth furnace," *Rev. Met.*, vol. 58, pp. 557-570 (1961).

Sutton et al., "Real-Time On-line Fugitive Dust Measurement and Control," *Coal Science and Technology*, vol. 24, No. 2, pp. 1597-1600 (1995).

Taylor et al., "Use of Instantaneous Samplers to Evaluate the Effectiveness of Respirable Dust Control Methods in Underground Mines," *Aerosols Min. Ind. Work. Environ. [Pap. Int. Symp.]*, vol. 2, pp. 433-440 (1983).

Wang et al., "Experimental Study on Improving the Effect of Coal Seam Water Injection with Compound Wetting Agent," *Safety in Coal Mines*, No. 7, pp. 9-11, 15 (2014)—Abstract Only.

Wedin et al., "Soluble organic additive effects on stress development during drying of calcium carbonate suspensions," *Journal of Colloid and Interface Science*, vol. 290, pp. 134-144 (2005).

Wei et al., "The characteristics of respirable dust in coal mine based on all working class," *China Occupational Safety and Health Management Sy*, No. 1, pp. 140-145 (2009)—Abstract Only.

Woodside et al., "Control of Dust in Stone Processing," *Quarry Management*, vol. 16, No. 3, pp. 29-31 (1989).

Wu et al., "Development of an in situ soil binding agent," *Waste Management*, vol. 20, pp. 527-535 (2000).

(56) References Cited

OTHER PUBLICATIONS

Yao et al., "The Characteristics of Respirable Dusts in Coal Mines Based on Everyday-working Class," *China Safety Science Journal*, vol. 19, No. 1, pp. 125-131 (2009)—Abstract Only.

Zebula et al., "Surface properties of oil shales," *Minerals and Metallurgical Processing*, vol. 4, No. 3, pp. 126-133 (1987).

European Patent Office, Extended European Search Report in European Patent Application No. 16863011.9, 9 pp. (dated May 16, 2019).

Decision on Grant in Russian Application No. 009260, dated Sep. 8, 2020, 19 pages (11 pages Official Copy and 8 pages English Translation).

Examination Report in Indonesian Application No. PID201802956, dated Jun. 8, 2020, 4 pages 2 pages Official Copy and 2 pages English Translation).

Office Action in Chilean Application No. 20181218, dated Mar. 5, 2020, 15 pp. (Official Copy Only—English Translation Not Available).

Examination Report in Indian Application No. 201817014939, dated Nov. 10, 2020, 6 pages.

\* cited by examiner

METHODS OF AND SYSTEMS FOR CONTROLLING DUST

This application is a nonprovisional application claiming the benefit of U.S. Provisional Patent Application No. 62/252,081, filed Nov. 6, 2015, the contents of which are incorporated by reference herein in its entirety.

TECHNICAL FIELD

The present disclosure relates to methods of controlling dust. More particularly, the present disclosure relates to methods of dispensing dust suppressant.

BACKGROUND

Generally, dust is caused by particulates. Regardless of their size, particulates have the propensity to become airborne when acted upon by external forces. However, airborne particulates that are less than 10 μm in diameter are considered respirable dust. Dust generated in mining operations, particularly in underground mining operations, can cause significant health, environmental and safety concerns. For example, respirable coal dust exposure to persons working in underground coal mines is a known health hazard, and overexposure can lead to serious lung disease, commonly known as coal workers' pneumoconiosis ("CWP"). In addition to respiratory hazards, coal dust is a fire hazard, especially in underground operations because of difficulties related to escape or evacuation. Similarly, in other mining operations (e.g., metal or non-metal mines), health hazards are often associated with exposure to respirable crystalline silica dust, which can lead to silicosis.

SUMMARY

Methods of and systems for dispensing dust suppressant are provided. In an embodiment, the method comprises forming an aqueous dispersion stream by delivering a surfactant composition to an aqueous liquid stream. The aqueous dispersion stream is mixed to form a dust suppressant. The dust suppressant is dispensed to a surface at a pressure sufficient to provide coverage of the surface. Surface tension of the dust suppressant is measured via a tensiometer, and the measurement is relayed to a controller. The forming of the aqueous dispersion stream is adjusted according to the measured surface tension relayed to the controller.

In an alternate embodiment, the method comprises forming an aqueous dispersion stream by delivering a surfactant composition to an aqueous liquid stream via a delivery device. The aqueous dispersion stream is mixed via an inline mixer to form a dust suppressant. The dust suppressant is dispensed to a surface at a pressure sufficient to provide coverage of the surface. A side stream of the dust suppressant is diverted such that the side stream has a pressure less than the pressure sufficient to provide coverage of the surface. Surface tension of the dust suppressant is measured via a tensiometer in communication with a controller in communication with the delivery device, and the measurement is relayed to a controller. The forming of the aqueous dispersion stream is adjusted according to the measured surface tension relayed to the controller via a signal relayed from the controller to the delivery device. The diverting, the measuring, the relaying, and the adjusting are repeated so that the dust suppressant has a measured surface tension of from about 20 dynes per centimeter to about 45 dynes per centimeter.

In yet another embodiment, a system for controlling surface tension in dust suppressant is provided. The system comprises a delivery device, a mixer, a tensiometer, and a controller. The delivery device is arranged to deliver a surfactant stream to an aqueous liquid stream to form an aqueous dispersion stream. The mixer comprises an inlet for receiving the aqueous dispersion stream and an outlet for providing a dust suppressant stream. The tensiometer is configured to measure surface tension of the dust suppressant in the dust suppressant stream. The controller is in communication with the tensiometer and is configured to receive and interpret the measured surface tension. The controller is further in communication with the delivery device, thereby providing control of the surface tension of the dust suppressant.

The methods and systems are further described herein.

DETAILED DESCRIPTION

Figure 1:
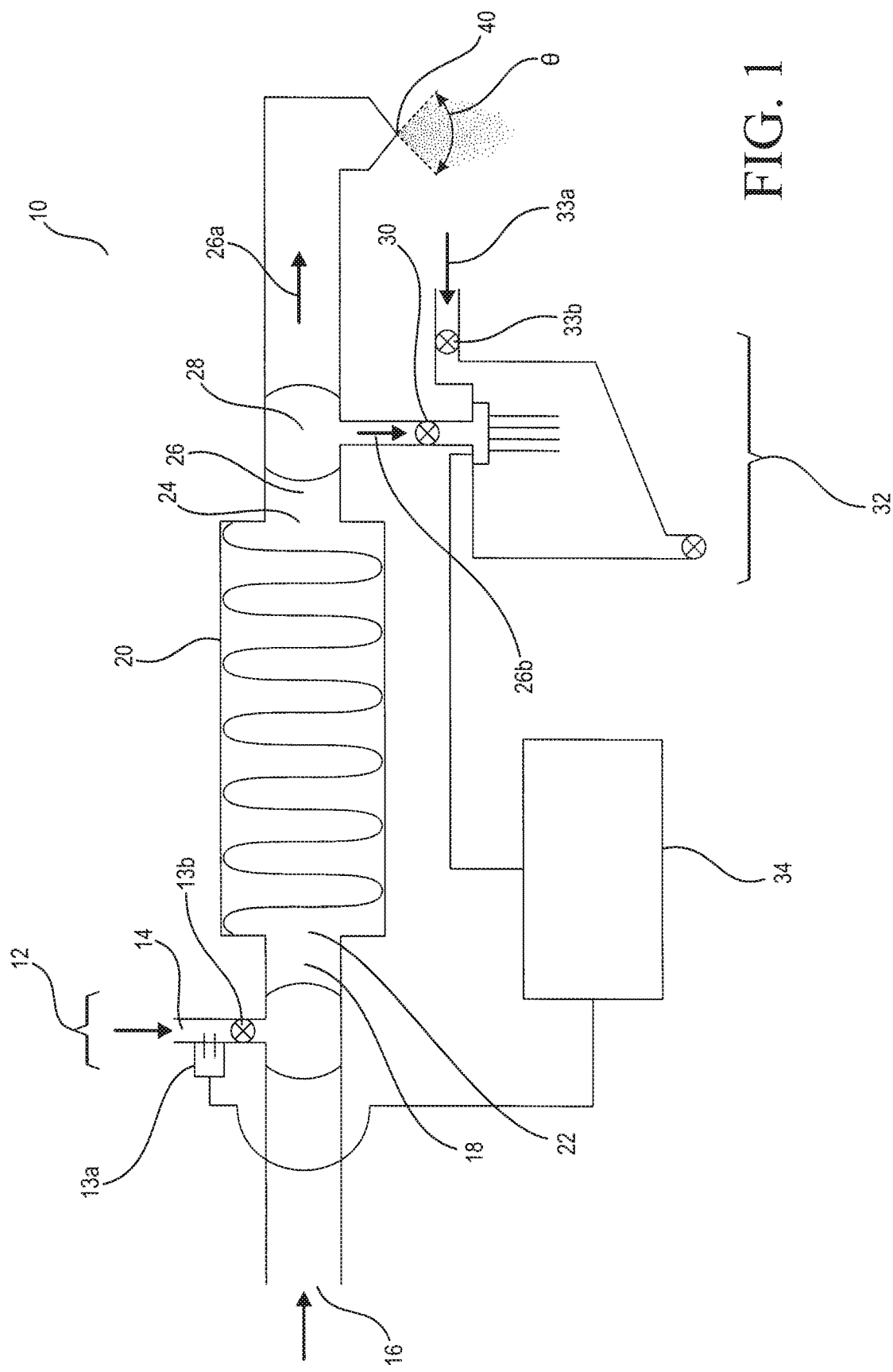
FIG. 1 is a schematic diagram of an embodiment of a system that may be utilized to carry out the methods of the present disclosure.

Methods of and systems for dispensing dust suppressant are provided. In an embodiment, the method comprises forming an aqueous dispersion stream by delivering a surfactant composition to an aqueous liquid stream. The aqueous dispersion stream is mixed to form a dust suppressant. The dust suppressant is dispensed to a surface at a pressure sufficient to provide coverage of the surface. Surface tension of the dust suppressant is measured via a tensiometer, and the measurement is relayed to a controller. The forming of the aqueous dispersion stream is adjusted according to the measured surface tension relayed to the controller.

In an alternate embodiment, the method comprises forming an aqueous dispersion stream by delivering a surfactant composition to an aqueous liquid stream via a delivery device. The aqueous dispersion stream is mixed via an inline mixer to form a dust suppressant. The dust suppressant is dispensed to a surface at a pressure sufficient to provide coverage of the surface. A side stream of the dust suppressant is diverted such that the side stream has a pressure less than the pressure sufficient to provide coverage of the surface. Surface tension of the dust suppressant is measured via a tensiometer in communication with a controller in communication with the delivery device, and the measurement is relayed to a controller. The forming of the aqueous dispersion stream is adjusted according to the measured surface tension relayed to the controller via a signal relayed from the controller to the delivery device. The diverting, the measuring, the relaying, and the adjusting are repeated so that the dust suppressant has a measured surface tension of from about 20 dynes per centimeter to about 45 dynes per centimeter.

In yet another embodiment, a system for controlling surface tension in dust suppressant is provided. The system comprises a delivery device, a mixer, a tensiometer, and a controller. The delivery device is arranged to deliver a surfactant stream to an aqueous liquid stream to form an aqueous dispersion stream. The mixer comprises an inlet for receiving the aqueous dispersion stream and an outlet for providing a dust suppressant stream. The tensiometer is configured to measure surface tension of the dust suppressant in the dust suppressant stream. The controller is in communication with the tensiometer and is configured to receive and interpret the measured surface tension. The controller is further in communication with the delivery device, thereby providing control of the surface tension of the dust suppressant.

The term "dust suppressant" is utilized herein to describe a blended aqueous substance to be dispensed so as to contact particles and improve dust suppression (i.e., prevent and/or limit dust). In embodiments of the present methods, an aqueous dispersion is formed by delivery of a surfactant composition to an aqueous liquid. The term "aqueous dispersion" is used to denote that the surfactant composition and aqueous liquid have been combined but not necessarily mixed. Mixing the aqueous dispersion, which is further described herein, completes creation of the dust suppressant.

A surfactant composition may be delivered to an aqueous liquid in any one or more ways, including, but not limited to, pumping, gravity feed, and combinations thereof.

The surfactant composition includes one or more compounds that improve dust suppression. While not wishing to be bound by theory, the surfactant composition is believed to improve dust suppression by reducing surface tension of water, which allows improved wetting of dust particle surfaces, and thus improves dust suppression.

The surfactant composition may be a solid or a liquid. The term "liquid" is used to describe a composition that comprises a liquid, which in certain embodiments is a solution, a slurry, an emulsion, a dispersion, and combinations thereof. In certain embodiments, the surfactant composition is a liquid, and, in certain embodiments, is a liquid having an intrinsic viscosity of about 0.1 to about 1500 cPs.

Surfactant compounds suitable for inclusion in the surfactant compositions include, but are not limited to, anionic surfactants, cationic surfactants, zwitterionic surfactants, nonionic surfactants, and combinations thereof. Anionic surfactants include alkyl aryl sulfonates, sulfonates, paraffin sulfonates, alcohol sulfates, alcohol ether sulfates, alkyl carboxylates and alkyl ether carboxylates, alkyl and ethoxylated alkyl phosphate esters, and mono and dialkyl sulfosuccinates and sulfosuccinamates. Cationic surfactants include, but are not limited to, alkyl trimethyl quaternary ammonium salts, alkyl dimethyl benzyl quaternary ammonium salts, dialkyl dimethyl quaternary ammonium salts, and imidazolinium salts. Nonionic surfactants include, but are not limited to, alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropripionates and amphodipropionates, and alkyliminodipropionate. In certain embodiments, the surfactant compound suitable for inclusion in the surfactant composition, and therefore in the aqueous dispersion and the dust suppressant, comprises at least one of $C_{14-16}$ alpha olefin sulfonate and sodium dodecyl benzene sulfonate.

In certain embodiments of the inventive methods, the surfactant composition includes at least one of a quaternary ammonium compound, an amine oxide, an ionic or non-ionic surfactant, and combinations thereof. Suitable quaternary ammonium compounds include, but are not limited to, alkyl benzyl ammonium salt; benzyl cocoalkyl($C_{12}$-$C_{18}$) dimethylammonium salt; dicocoalkyl ($C_{12}$-$C_{18}$)dimethylammonium salt; ditallow dimethylammonium salt; di(hydrogenated tallow alkyl)dimethyl quaternary ammonium methyl salt; methyl bis(2-hydroxyethyl cocoalkyl($C_{12}$-$C_{18}$) quaternary ammonium salt; dimethyl(2-ethyl) tallow ammonium methyl salt; n-dodecylbenzyldimethylammonium salt; n-octadecylbenzyldimethyl ammonium salt; n-dodecyltrimethylammonium salt; soya alkyltrimethylammonium salt; and hydrogenated tallow alkyl (2-ethylhyexyl) dimethyl quaternary ammonium methyl salt. In certain embodiments, the salts of the aforementioned compounds are chlorides and/or sulfates.

Water soluble non-ionic monomers include, but are not limited to, acrylamide, N-substituted derivatives of acrylamide, hydroxyalkyl acrylates, and hydroxyalkyl methacrylates. Anionic monomers include, but are not limited to, salts of acrylic acid, methacrylic acid, ethacrylic acid, α-chloroacrylic acid, crotonic acid, itaconic acid, maleic acid, fumaric acid, vinyl sulfonic acid, and 2-acrylamido-2-methyl propane sulfonic acid. Cationic monomers include, but are not limited to, quaternary salts of dialkyl amino ethyl methacrylate, diallyl dimethyl ammonium chloride, vinyl benzyl-trimethyl ammonium chloride and the like. In certain embodiments, the nonionic monomers in the swellable polymer are selected from the group consisting of: acrylamide, N—N-dimethylacrylamide, 2-hydroxyethyl methacrylate, and combinations thereof.

In certain embodiments, the anionic monomers in the swellable polymer is an alkali (e.g., sodium) salt of a compound selected from the group consisting of: acrylic acid, methacrylic acid, 2-acrylamido-2-methyl propane sulfonic acid, and combinations thereof. In certain embodiments, the cationic monomer in the swellable polymer is diallyl dimethyl ammonium chloride. The water swellable cross-linked polymer can be synthesized with compounds having two ethylenic groups copolymerizable with water soluble monomers. Exemplary cross-linkers include N—N'-methylene-bis-acrylamide, N,N'-methylene-bis-methacrylamide, an alkylidene-bis-acrylamide, divinyl benzene sulfonate, ethylene glycol diacrylate, ethylene glycol dimethacrylate, diallyl ethylene glycol ether, divinyl ester of polyethylene glycol (e.g., polyethylene glycol-600 diacrylate), divinyl ether of polyethylene glycol and the like difunctional monomers.

In certain embodiments, the surfactant composition includes a nonionic surfactant. In certain embodiments, the nonionic surfactant is a coco-n-alcohol amine or amide, which in certain embodiments is cocodiethanolamide.

In certain embodiments, at least one of the water soluble brancher and the cross-linking agent is an adduct of glycerin and allyl glycidyl ether referred to herein as "B-brancher." Other types of branchers include the adducts of allylamine and a copolymer of maleic anhydride and methyl vinyl ether having differing mole ratios of allylamine to anhydrides, referred to herein as "A-branchers."

In certain embodiments, the surfactant compositions includes a homopolymer or copolymer of diallyldimethyl ammonium chloride ("DADMAC"), such as described in U.S. Pat. No. 4,561,905, which is incorporated herein by reference in its entirety. The copolymers may contain from about 5 mole percent to about 30 mole percent of a water soluble anionic monomer. These copolymers may be referred to as polyampholytes. In certain embodiments, the anionic monomer is at least one of acrylic acid and methacrylic acid, which is sometimes denoted as (meth)acrylic acid. The polymers may have an Intrinsic Viscosity of at least 0.3, as measured in 1 M $NaNO_3$ at 30° C. The amount of water soluble anionic monomer polymerized with DADMAC may vary from as little as about 5 mole percent to as much as about 30 mole percent. In certain embodiments, the monomers for copolymerization with DADMAC are methacrylic and/or acrylic acid, though other anionic vinyl monomers may be employed. Examples of such monomers are maleic acid, itaconic acid and fumaric acid. Furthermore, diluent monomers may be ter-polymerized with the DADMAC and the water soluble anionic monomer, and may be used in amounts of up to about 10 mole percent. In certain embodiments, the diluent monomers are the hydroxy $C_2$-$C_6$ alkyl acrylates and/or methacrylates. Other diluent monomers that may be utilized include, but are not limited to, acrylonitrile, acrylamide, styrene, vinyl acetate, and the like. The polymer containing the diluent monomers are attractive from the standpoint that most of the diluent monomers are inexpensive and in most cases do not materially detract from the activity of the DADMAC copolymer into which they have been incorporated. The copolymers and terpolymers of DADMAC as generally described above are illustrated in great detail in U.S. Pat. No. 4,715,962, the disclosure of which is incorporated herein by reference in its entirety. The polymer may be in the form of an aqueous solution or in the form of a water-in-oil emulsion, which in the presence of certain water soluble surfactant(s) invert into water and allow the polymer contained in the emulsion to dissolve rapidly. The dosage of the DADMAC polymer may be at least about 25 parts per million of polymer (i.e., grams of polymer per metric ton of metal-bearing material treated), or from about 50 parts per million to about 2,000 parts per million. The DADMAC polymer, including copolymer and terpolymer, may be in the form of an aqueous solution wherein the polymer content in the aqueous solution is from about 10 percent to about 50 percent by weight of the aqueous solution.

In certain embodiments, the surfactant composition includes a surfactant compound and a high terpene-containing natural oil, such as described in U.S. Pat. Nos. 5,330,671; 5,527,482; 5,863,456; 5,876,622; 5,958,287; and 6,124,366, each of which is incorporated herein by reference in its entirety. Surfactant compositions including a surfactant compound and a high terpene-containing natural oil are marketed as part of DUSTFOAM suppression systems by Enviroflo Engineering, an Ecolab Company. High terpene-containing natural oils are those natural oils having a terpene content of at least about 50%. The high terpene-containing natural oil may contain at least about 90% terpene. Suitable high terpene-containing natural oils include, but are not limited to, citrus peel oil, which includes, but is not limited to, orange peel oil (i.e., orange oil), grapefruit peel oil (i.e., grapefruit oil), and lemon peel oil (i.e., lemon oil). In certain embodiments, the high terpene-containing natural oils comprise orange peel oil, as it contains from about 90% to about 94% terpene and is very abundant in certain parts of the world. Pine oil is also a useful high terpene-containing natural oil.

The surfactant composition may include from about 1% to about 15% by weight high terpene-containing natural oil, or from about 8 to about 12% by weight, or from about 8 to about 10% by weight. The amount of high terpene-containing natural oil will depend upon the amount of terpene in the high terpene-containing natural oil. For example, in the case of orange peel oil, the orange peel oil can be present in the surfactant in an amount of from about 1 to about 15% by weight, or from about 8% to about 10% by weight. The terpene may break up oily (fatty) deposits on particles allowing the dust suppressant to better contact the particles. Conventional surfactants can be used in combination with the high terpene-containing natural oil, such as at least one of an anionic surfactant and a nonionic surfactant. In certain embodiments, an anionic surfactant is utilized, which may be, for example, a salt of a fatty acid, an alkyl sulfate, an alkyl ether sulfonate, an alkyl aryl sulfonate, multiples thereof, and combinations thereof. Further examples of surfactants that may be utilized include sodium dodecylbenzene sulfonate, sodium lauryl ether sulfate and salts such as a sodium salt of a secondary alkane sulfonate (e.g., Hostaspun SAS 60 marketed by Hoechst). Furthermore, the use of ethoxylated nonylphenols with, e.g., from about 8 to about 10 moles of ethylene oxide and/or ethoxylated octylphenols with, e.g., from about 8 to about 10 moles of ethylene oxide (e.g., alkylaryl polyglycol ether N9), may be utilized as well. In certain embodiments of the surfactant composition, the surfactant contains up to about 40% by weight surfactant(s), or from about 15% to about 25% by weight surfactant(s), or from about 20% to about 22% by weight.

The surfactant composition may further comprise a variety of additives such as, for example, an antioxidant and/or a preservative. An example of a suitable antioxidant is butylated hydroxytoluene (i.e., 2,6-di-tert-butyl-para-cresol; "BHT"). The antioxidant may be present in the composition in an amount of from about 0.01% to about 1% by weight, or from about 0.08% to about 0.12% by weight. Suitable preservatives include, but are not limited to, formaldehyde, methylparaben, propylparaben, borax, and combinations thereof. The preservative may be present in the composition in an amount of from about 0.5% to about 5% by weight, or from about 0.8% to about 1.2% by weight.

When formed, the aqueous dispersion, and therefore the dust suppressant, comprises an aqueous liquid, which comprises water. Water may make up the majority of the aqueous dispersion, and therefore the dust suppressant. Generally, the aqueous dispersion, and therefore the dust suppressant, may comprise from about 60% to about 99.9999% by weight water, including from about 60%, or from about 63%, or from about 66%, to about 99.999%, or to about 99.999%, or to about 99.99%, or to about 99.9%, or to about 99%, or to about 90% by weight water. The aqueous liquid may be derived from fresh water, sea water, brine, mixtures of water and non-toxic water soluble organic compounds, recycled process water, and combinations thereof.

Water present in the aqueous liquid may be provided by any one or more of several potential sources. Generally, in the case of mining operations, the source of water is necessitated by the presence or convenience of a particular source of water to the geographic location of the mine. By way of example, the source of the water present in the aqueous liquid may be at least one of tap water, well water, pond water, river water, runoff, recycled water from an industrial process. The characteristics of the water from these sources may vary widely. Therefore, measurement of the surface tension in the dust suppressant during operation can provide information that can be used to adjust the formation of the aqueous dispersion stream, and thus, the dispensing of the dust suppressant to the surface.

An example of an effective surfactant composition comprises about 11% sodium dodecyl benzene sulfonate, about 5% sodium lauryl ether sulfate, about 9% cold pressed orange peel oil, about 3% alkyl aryl polyglycolether N9, about 1% of a sodium salt of a secondary alkane sulfonate, about 1% formaldehyde, and about 0.1% of an antioxidant; with the balance being water (all percentages are by weight). A further example of an effective surfactant composition comprises 10.95% (i.e., about 11%) sodium dodecyl benzene sulfonate, 5.1% (i.e., about 5%) sodium lauryl ether sulfate, 9.1% (i.e., about 9%) cold pressed orange oil, 3.5% (i.e., about 3%) alkyl aryl polyglycolether N9, 1.4% (i.e., about 1%) of a sodium salt of a secondary alkane sulfonate, 1% formaldehyde, and 0.1% of an antioxidant. In certain embodiments, the balance is water (all percentages are by weight).

Another example of an effective surfactant composition comprises from about 15% to about 20% (e.g., about 17%) $C_{14\text{-}16}$ alpha olefin sulfonate, from about 0.1% to about 3% (e.g., about 1%) orange peel oil, from about 0.1% to about 2% (e.g., about 0.6%) cocodiethanolamide, and from about 0.01% to about 1% (e.g., about 0.1%) antioxidant. In certain embodiments, the balance is water (all percentages are by weight).

While delivery of the surfactant composition to the aqueous liquid is controlled via the measurement of surface tension in the dust suppressant, the concentration of surfactant composition may vary in the dust suppressant. The surfactant composition may be delivered to the aqueous liquid, and therefore present in the aqueous dispersion and the dust suppressant, in an amount of from about 1 part per million ("ppm") to about 40%, including from about 1 ppm, or from about 5 ppm, or from about 10 ppm, or from about 15 ppm, or from about 20 ppm, to about 40%, or to about 30%, or to about 20%, or to about 10%, or to about 5%, or to about 1%, or to about 0.1%, or to about 0.01% (i.e., about 100 ppm), or to about 0.005% (i.e., about 50 ppm), or to about 0.004% (i.e., about 40 ppm). In certain embodiments, the surfactant composition is delivered to the aqueous liquid, and therefore present in the aqueous dispersion and the dust suppressant, in an amount of from about 20 ppm to about 40 ppm. Referring to the dosage of the surfactant composition, the term "part(s) per million" (i.e., "ppm") refers to grams of surfactant per million grams of aqueous dispersion, and therefore, in certain embodiments, per million grams of dust suppressant.

In embodiments of the methods, the aqueous dispersion is mixed, thereby forming the dust suppressant. In certain embodiments of the methods, the mixing is performed via at least one of a stirred tank, an inline mixer, turbulent flow created inside a conduit carrying the aqueous dispersion, and combinations thereof. In certain embodiments, the mixing is performed via an inline mixer. In-line mixers are available from, for example, Koflo, Cary, Ill., USA; and Sulzer Chemtech USA Inc., Tulsa, Okla., USA. A further example of an in-line mixer is PARETO mixing technology, available from Nalco, an Ecolab company, 1601 West Diehl Road, Naperville, Ill. 60563, which is described at least in part in U.S. Pat. Nos. 7,550,060; 7,785,442; 7,938,934; and 7,981,251, the disclosure of each of which is incorporated herein by reference in its entirety.

In embodiments of the methods, the dust suppressant is dispensed to a surface at pressure sufficient to provide coverage of the surface. The dust suppressant may be dispensed in any one or more of several fashions. For example, dust suppressant can be delivered under pressure via conduits equipped with nozzles configured to provide atomization of the dust suppressant and sufficient to provide coverage of the surface. In certain embodiments, the atomization of the dust suppressant forms droplets of dust suppressant having a mean droplet size of about 0.1 µm to about 100 µm. In certain embodiments, the atomization of the dust suppressant forms foam. Dust suppression using foam can be effective, particularly where water availability is limited and/or heavy runoff needs to be avoided.

The term "surface" is used herein to describe a wall, floor, ceiling, or the like, or a portion thereof, of a seam; the outer surface of a particulate; the outer surface of a mined product; an outer surface of a stockpile of mined product; and combinations thereof. The term "mined product" is intended to include any ore deposit that has been extracted from a surface of a mine. The term "extracted" denotes that the "mined product" is no longer in its natural state, e.g., the mined product is no longer attached to the seam. Mined product may be present in the mine or may have been removed from the mine. Mined product may be unprocessed or processed. Mined product may be rich in resources or essentially waste set to be discarded. Mined product may be stockpiled, for example, for processing, transport, or discard. In certain embodiments, the surface comprises particulate matter comprising at least one of mineral, coal, ore, dirt, clay, limestone, salt, tailings, and processed matter thereof. Particulates can be generated during mining, handling and/or transfer of the mined product, and the methods disclosed herein can be practiced during handling or transfer, or both handling and transfer, of mined product.

The phrase "coverage of the surface" is utilized to denote that a desired surface as defined herein is covered by the dispensed dust suppressant as intended by the dispensing operation in the absence of the disclosed methods and/or systems. That is, if the dispensing operation is arranged so as to dispense dust suppressant to a certain portion of a surface, then the certain portion of the surface is "the surface" to be covered as it relates to the methods and systems described herein. The phrase "at pressure sufficient to provide coverage of the surface" denotes that the dust suppressant is transported in a manner such that the dust suppressant is dispensed, e.g., through a spray nozzle at a pressure sufficient to cover the surface. For a flow-restricting device such as a spray nozzle to perform as designed, a certain amount of pressure is generally necessary. Spraying dust suppressant under relatively high pressure onto a surface aids in particulate agglomeration, which suppresses dust formation. Conventional spray nozzles, in the absence of surfactant, can produce water droplets having a diameter of about 40 to 60 µm, which can effectively suppress particulates of comparable size. However, droplets of smaller size are necessary to suppress particulates that are smaller in size. The droplet size of water in the absence of surfactant cannot generally be reduced because of water's inherent surface tension of approximately 72 dynes per centimeter.

In certain embodiments of the methods, the pressure sufficient to provide coverage of the surface is from about 1 psig to about 100 psig, including from about 10 psig, or from about 15 psig, or from about 20 psig, to about 100 psig, or to about 80 psig, or to about 60 psig, or to about 40 psig.

In certain embodiments of the methods, the surface tension of the dust suppressant is measured by diverting a side stream of the dust suppressant to the tensiometer. In certain embodiments, the side stream has a pressure less than the pressure sufficient to provide coverage of the surface. The reduced pressure of the side stream can allow for surface tension measurements under atmospheric pressure. Surface tension is a phenomenon of intermolecular forces that leads to two competing forces: cohesive forces and adhesive forces. Several methods are available to measure surface tension in stationary conditions using, e.g., a bench-top tensiometer. However, frequent or even continuous measurements may be necessary for the applications described herein. In certain embodiments, the measuring of the surface tension of the dust suppressant is performed at least once per week, or at least once per day, or at least once per 12 hours, or at least once per 3 hours, or at least once per hour, or at least once per 30 minutes, or at least once per 15 minutes, or at least once per five minutes, or at least once per four minutes, or at least once per three minutes, or at least once per two minutes, or at least once per minute, or at least once per 30 seconds, or at least once per 10 seconds, or at least once per second, or at least twice per second, or continuously. A tensiometer capable of performing frequent or even continuous surface tension measurement is, for example, a maximum bubble pressure tensiometer. Embodiments of bubble pressure tensiometers include the Clean Line ST tensiometer, available from Sita Process Solutions, Dresden, Germany, and the Sensadyne IP6000 In-Process Surface Tensiometer, available from Divtech Equipment, Cincinnati, Ohio, USA.

In certain embodiments, the side stream of the dust suppressant is diverted via a pipe tee equipped with an automated valve operably connected to the controller. In certain embodiments of the methods, the side stream of the dust suppressant has a pressure of from about 0 psig to about 80 psig, including from about 1 psig, or from about 2 psig, to about 40 psig, or to about 20 psig, or to about 10 psig. In certain embodiments, the side stream of the dust suppressant has a pressure of about 0 psig. In certain embodiments, the flow of the side stream of the dust suppressant is stopped, and the surface tension of the side stream is measured using the tensiometer after the flow of the side stream has been stopped.

In certain embodiments of the methods, a side stream of the dust suppressant is not diverted. In certain embodiments, the main flow of the dust suppressant contacts the tensiometer, and the surface tension of the dust suppressant is measured prior to the dust suppressant being dispensed. In such embodiments, the flow of the dust suppressant is temporarily stopped to allow for the measurement of the surface tension of the dust suppressant. With the flow of the dust suppressant temporarily stopped, the tensiometer can measure surface tension of the dust suppressant. In certain embodiments of the methods, the main flow of the dust suppressant, when the flow is temporarily stopped, has a pressure of from about 0 psig to about 80 psig, including from about 1 psig, or from about 2 psig, to about 40 psig, or to about 20 psig, or to about 10 psig. In certain embodiments, the main flow of the dust suppressant, when the flow is temporarily stopped, has a pressure of about 0 psig.

In certain embodiments, the dust suppressant is dispensed via at least one spray nozzle, which provides mist onto the surface. In certain embodiments, the mist has a droplet size of from about 1 μm to about 100 μm, including from about 5 μm, or from about 10 μm, to about 50 μm, or to about 30 μm. In certain embodiments, the dust suppressant is dispensed at a spray angle of from about 45 degrees to about 170 degrees, including from about 60 degrees, or from about 80 degrees, to about 150 degrees, or to about 120 degrees. The term "spray angle" is used to describe the angle that a particular spraying device (e.g., spray nozzle) provides coverage (i.e., the angle "width" of the spray). Examples of spray angle are shown as θ in FIGS. 1-4. The dust suppressant may be dispensed via any spray pattern, and, in certain embodiments, the dust suppressant is dispensed in a spray pattern such that the dust suppressant provides coverage of the surface with minimal mechanical intervention (e.g., without needing to move the spraying device(s)).

The methods include the step of measuring surface tension of the dust suppressant with a tensiometer. In certain embodiments, the surface tension of the dust suppressant is measured by a tensiometer selected from the group consisting of: a capillary rise tensiometer, a stalagmometric (i.e., drop volume) tensiometer, a Wilhelmy plate tensiometer, a Wilhelmy ring tensiometer, a tensiometer that analyzes the shape of a hanging liquid drop, a tensiometer that analyzes the shape of a gas bubble, a tensiometer that analyzes the shape of an oscillating liquid jet, and a maximum bubble pressure tensiometer. In certain embodiments of the methods is a maximum bubble pressure tensiometer as described herein. The maximum bubble pressure correlates the measured maximum bubble pressure of a liquid (for the methods described herein, of the dust suppressant) with the surface tension of the liquid. As used herein, correlating the measured maximum bubble pressure of the liquid with the surface tension of the liquid is a form of measuring surface tension.

By way of example, a maximum bubble pressure tensiometer measures surface tension of a liquid by submersing a fine capillary into the liquid, which causes the liquid to rise into the capillary. The pressure at the meniscus (i.e., the liquid-gas interface inside the capillary) is zero. An external source of gas (e.g., air; shown in the figures as flow 33*a* with valve 33*b*) pressure gradually increases, thereby pushing down on the meniscus and eventually forming a bubble at the end of the capillary. As the gas pressure increases, the bubble expands and forms a hemisphere when the pressure inside the bubble has reached its maximum for the liquid. As the bubble grows larger than the hemisphere, the equilibrium pressure inside decreases and makes the bubble unstable, thereby causing the bubble to dislodge. The surface tension of the liquid is correlated from the measured maximum pressure.

In order to eliminate the influence of inaccuracies that may be caused by, for example, foam and/or suspended particles, a comparative maximum bubble pressure tensiometer may be utilized, which performs two maximum pressure measurements as described herein using two capillaries of dissimilar orifices. The pressure differential between the two bubbles is used to correlate with the surface tension of the liquid. An example of a comparative maximum bubble pressure tensiometer is the Sensadyne IP6000 In-Process Surface Tensiometer discussed herein.

The measured surface tension of the dust suppressant is relayed to a controller. The relaying may be performed in any suitable manner, including wired electronic signal, wireless electronic signal, manually entering the measured surface tension, and other known methods of relaying information. In certain embodiments, the tensiometer is in communication with the controller; thus, the tensiometer is capable of automatically relaying the measured surface tension to the controller (i.e., without human intervention).

In the embodiments of the methods, the forming of the aqueous dispersion stream, and therefore the dust suppressant, is adjusted according to the measured surface tension of the dust suppressant relayed to the controller. The term "adjusted" denotes controlling the creation of the aqueous dispersion, and therefore the dust suppressant, by any one or more of several control schemes. For example, the adjusting of the delivery of the surfactant composition to the aqueous liquid may attempt to achieve at least one of a setpoint surface tension, a control range of surface tension, and a control algorithm that, e.g., calculates a variable setpoint depending on one or more other conditions present when performing the method. In certain embodiments, the diverting, the measuring, the relaying, and the adjusting steps are repeated, thereby allowing for feedback control.

To adjust the forming of the aqueous dispersion, and therefore the dust suppressant, any one or more of several variables may be adjusted. For example, in certain embodiments, the adjusting of the forming of the aqueous dispersion stream is performed via at least one of increasing the amount of the surfactant delivered to the aqueous liquid; decreasing the amount of the surfactant delivered to the aqueous liquid; increasing the amount of the aqueous liquid to which the surfactant is delivered; decreasing the amount of the aqueous liquid to which the surfactant is delivered; selecting an alternate surfactant; adjusting the mixing of the aqueous dispersion; adjusting a physical parameter of the method; and combinations thereof.

Certain embodiments of the methods attempts to control surface tension of the dust suppressant at a range of surface tension values. In certain embodiments, the dust suppressant has a measured surface tension of from about 20 dynes per centimeter to about 45 dynes per centimeter. The measured surface tension of the dust suppressant may be from about 20 dynes per centimeter, or from about 25 dynes per centimeter, or from about 30 dynes per centimeter, to about 45 dynes per centimeter, or to about 40 dynes per centimeter, or to about 35 dynes per centimeter. In certain embodiments, the dust suppressant has a measured surface tension of from about 30 dynes per centimeter to about 35 dynes per centimeter.

Figure 3:
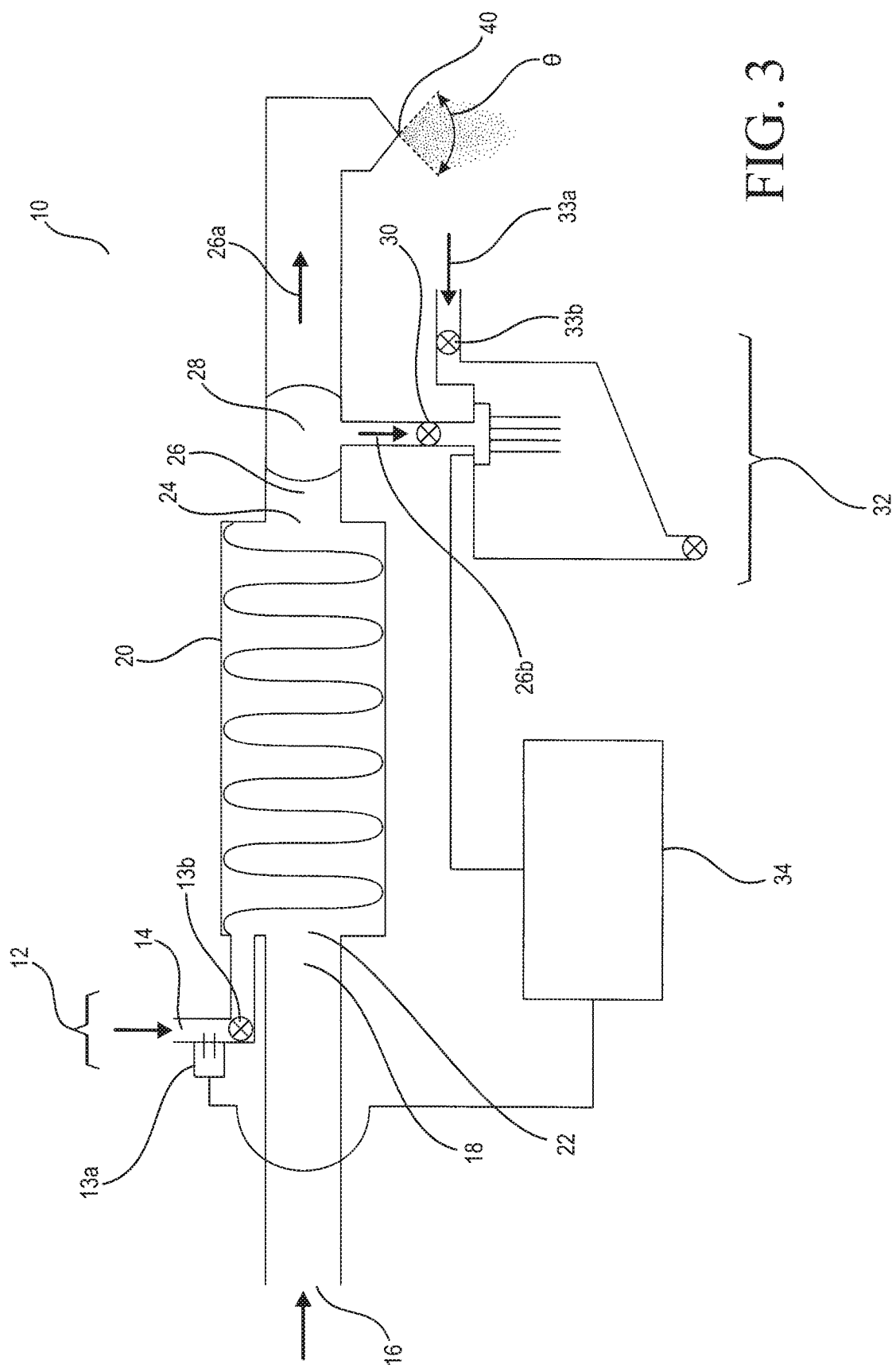
FIG. 3 is a schematic diagram of a second alternate embodiment of a system that may be utilized to carry out methods of the present disclosure.

To carry out the methods, systems for controlling surface tension in dust suppressant are provided. The system may further dispense the dust suppressant to a surface. FIG. 1 is a schematic diagram of an embodiment of a system that may be utilized to carry out the methods of the present disclosure. FIG. 3 is a schematic diagram of an alternate embodiment of a system that may be utilized to carry out the methods of the present disclosure. As shown in FIGS. 1 and 3, system 10 comprises delivery device 12, which in certain embodiments comprises dosage measurement device 13a and valve 13b, arranged to deliver surfactant stream 14 to aqueous liquid stream 16 (in FIG. 3, to aqueous liquid stream 16 via mixer 20) to form aqueous dispersion stream 18. Mixer 20 has inlet 22, which receives aqueous dispersion stream 18, and outlet 24, which provides dust suppressant stream 26. Tee 28 is configured to receive and split dust suppressant stream 26 such that main dust suppressant stream 26a is dispensed to a surface, and side stream 26b is in fluid communication with valve 30, such that side stream 26b is present when valve 30 is in an open position. Tensiometer 32 is configured to receive and measure surface tension of side stream 26b. Air stream 33a is delivered to tensiometer 32 via valve 33b, which tensiometer 32 uses to measure surface tension of dust suppressant in side stream 26b. Controller 34 is in communication with delivery device 12, thereby providing control of the surface tension of the dust suppressant.

Figure 2:
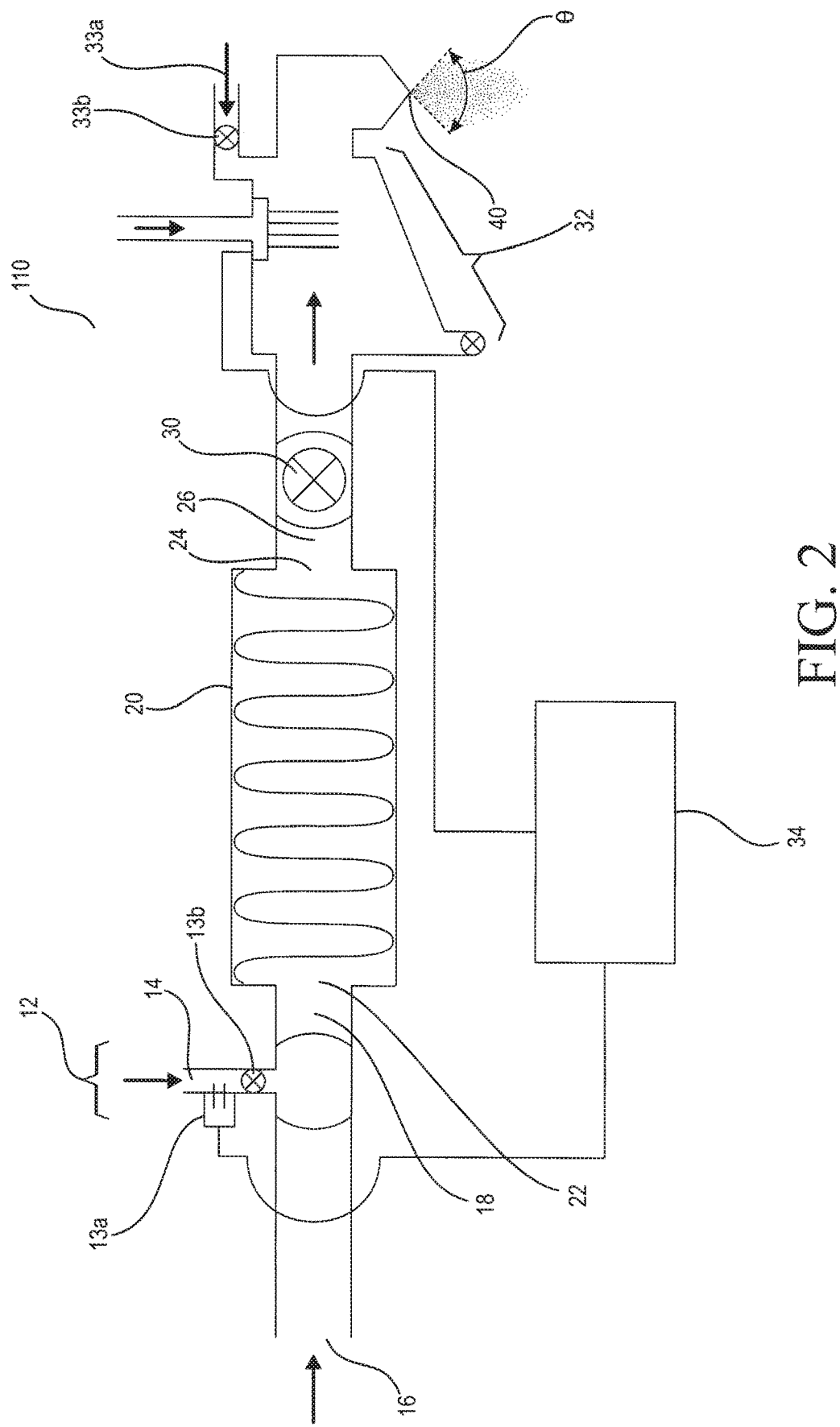
FIG. 2 is a schematic diagram of an alternate embodiment of a system that may be utilized to carry out methods of the present disclosure.
Figure 4:
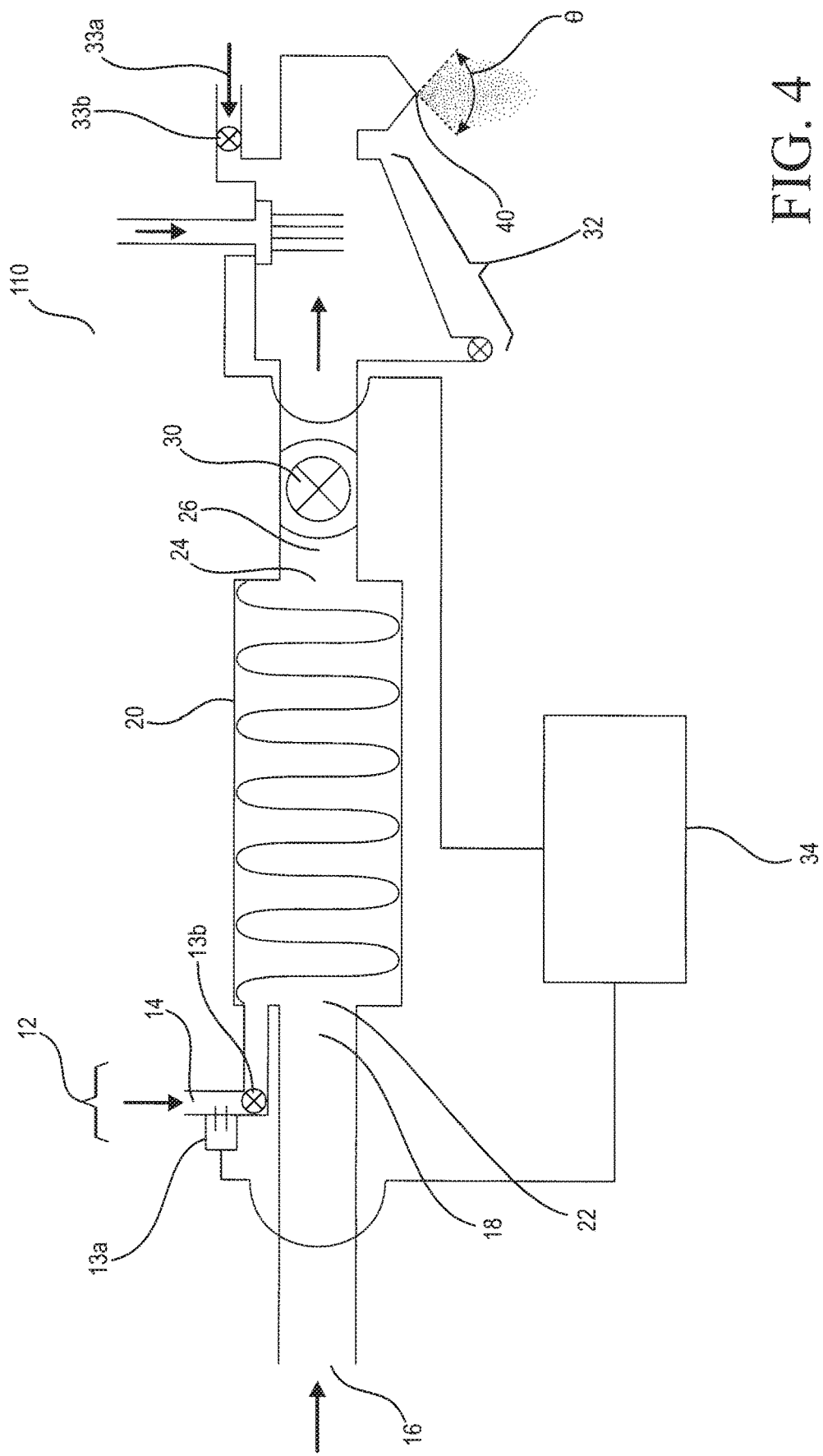
FIG. 4 is a schematic diagram of a third alternate embodiment of a system that may be utilized to carry out methods of the present disclosure.

FIG. 2 is a schematic diagram of an alternate embodiment of a system that may be utilized to carry out methods of the present disclosure. FIG. 4 is a schematic diagram of an alternate embodiment of a system that may be utilized to carry out the methods of the present disclosure. In FIGS. 2 and 4, system 110 comprises delivery device 12, which in certain embodiments comprises dosage measurement device 13a and valve 13b, arranged to deliver surfactant stream 14 to aqueous liquid stream 16 (in FIG. 4, to aqueous liquid stream 16 via mixer 20) to form aqueous dispersion stream 18. Mixer 20 has inlet 22, which receives aqueous dispersion stream 18, and outlet 24, which provides dust suppressant stream 26. Tensiometer 32 is configured to receive and measure surface tension of dust suppressant stream 26. Air stream 33a is delivered to tensiometer 32 via valve 33b, which tensiometer 32 uses to measure surface tension of dust suppressant in dust suppressant stream 26. Controller 34 is in communication with delivery device 12, thereby providing control of the surface tension of the dust suppressant.

Systems of the present disclosure may further comprise at least one spray nozzle 40 (see, e.g., FIGS. 1-4) for receiving and dispensing dust suppressant stream 26 or main dust suppressant stream 26a to a surface. In certain embodiments of the system, the at least one spray nozzle is capable of dispensing the dust suppressant at a spray angle of about 80 degrees to about 170 degrees. In certain embodiments of the system, the spray nozzle is capable of providing mist onto a surface. In certain embodiments of the system, the spray nozzle is capable of providing mist comprising droplets having an average droplet size as described herein.

In embodiments of the systems, a delivery device is arranged to deliver a surfactant stream to an aqueous liquid stream to form an aqueous dispersion stream. A delivery device, as described herein, is a device arranged to be capable of delivering a surfactant stream to an aqueous liquid stream. In certain embodiments, the delivery device is a pump capable of delivering the surfactant stream to the aqueous liquid stream. In certain embodiments, the pump is configured to deliver a stream of the surfactant composition to the aqueous liquid stream prior to being mixed such that the water-to-surfactant volume ratio is from about 5:1 to about 10,000:1.

In embodiments of the systems, a mixer has an inlet for receiving the aqueous dispersion stream and an outlet for providing a dust suppressant stream. In certain embodiments, the mixer is an inline mixer, which is described herein. In certain embodiments of the systems, the mixer is configured to produce a dust suppressant that is a homogeneous aqueous dispersion.

In embodiments of the systems, a tensiometer as described herein is configured to measure surface tension of the dust suppressant in the dust suppressant stream. The tensiometer may be configured to measure the surface tension of the dust suppressant in the dust suppressant stream via the main flow of the dust suppressant, or via a side stream of the dust suppressant. A side stream of dust suppressant allows for surface tension measurements at atmospheric pressure and with no flowing stream. The tensiometer can alternately be configured to measure the surface tension of the "main flow" dust suppressant stream (e.g., dust suppressant stream 26 of FIGS. 2 and 4). For such a configuration when using a maximum bubble pressure tensiometer, assurance that the flow of the dust suppressant stream does not interfere with the dislodging of the bubble in the tensiometer, as such interference will cause inaccurate measurement. In certain embodiments, the method is performed so that the dust suppressant stream does not interfere with the measurement of surface tension.

In embodiments of the systems, a controller is in communication with the tensiometer and configured to receive and interpret the measured surface tension. The controller is further in communication with the delivery device, and thereby provides control of the surface tension of the dust suppressant. As it pertains to this disclosure, unless otherwise indicated, "controller" refers to one or more electronic devices having components such as a processor, memory device, digital storage medium, cathode ray tube, liquid crystal display, plasma display, touch screen, or other monitor, and/or other components. Controllers include, for example, an interactive interface that guides a user, provides prompts to the user, or provides information to the user regarding any portion of the method of the disclosure. Such information may include, for example, building of calibration models, data collection of one or more parameters, measurement location(s), management of resulting data sets, etc.

Generally, the controller is operable for integration and/or communication with one or more application-specific integrated circuits, programs, computer-executable instructions or algorithms, one or more hard-wired devices, wireless devices, and/or one or more mechanical devices such as liquid handlers, hydraulic arms, servos, or other devices. Moreover, the controller is operable to integrate feedback, feed-forward, or predictive loop(s) resulting from, inter alia, the parameters measured by practicing the method(s) of the present disclosure. Some or all of the controller system functions may be at a central location, such as a network server, for communication over a local area network, wide area network, wireless network, extranet, the Internet, microwave link, infrared link, and the like, and any combinations of such links or other suitable links. In addition, other components such as a signal conditioner or system monitor may be included to facilitate signal transmission and signal-processing algorithms.

By way of example, the controller is operable to implement the method of the disclosure in a semi-automated or fully-automated fashion. In another embodiment, the controller is operable to implement the method in a manual or semi-manual fashion.

Data transmission of any of the measured parameters or signals to a user, chemical pumps, alarms, or other system components is accomplished using any suitable device, such as a wired or wireless network, cable, digital subscriber line, internet, etc. Any suitable interface standard(s), such as an ethernet interface, wireless interface (e.g., IEEE 802.11a/b/g/n, 802.16, Bluetooth, optical, infrared, other radiofrequency, any other suitable wireless data transmission method, and any combinations of the foregoing), universal serial bus, telephone network, the like, and combinations of such interfaces/connections may be used. As used herein, the term "network" encompasses all of these data transmission methods. Any of the components, devices, sensors, etc., herein described may be connected to one another and/or the controller using the above-described or other suitable interface or connection. In an embodiment, information (collectively referring to all of the inputs or outputs generated by the method of the disclosure) is received from the system and archived. In another embodiment, such information is processed according to a timetable or schedule. In a further embodiment, such information is processed in real-time. Such real-time reception may also include, for example, "streaming data" over a computer network.

While the system may be capable of dispensing the dust suppressant stream to a surface by any means possible, certain systems further comprise at least one spray nozzle for receiving and dispensing the dust suppressant stream to a surface. When utilized, the spray nozzle(s) may be one or more of several types, including, for example, hollow cone, full cone, flat fan, hydraulic fine, and/or air atomizing.

Hollow cone spray nozzles provide a cone-shaped spray and generally provide small- to medium-size droplets. Comparatively speaking, the outlets of hollow cone spray nozzles are generally somewhat larger in diameter than other spray nozzles and are less prone to plugging. Hollow cone spray nozzles are widely used to knock down airborne dust.

Full cone spray nozzles are also conical in shape, but the "interior" of the cone is substantially filled in with spray. Full cone spray nozzles generally provide medium- to large-size droplets. Full cone spray nozzles can be used to achieve uniform wetting of, e.g., a surface. Full cone spray nozzles are primarily used for dust prevention, but not for suppression of airborne dust.

Flat fan spray nozzles generally provide small- to medium-size droplets and are available across a wide range of flow rates and spray angles. Flat fan spray nozzles are generally used to create spray "curtains" to contain dust at a specific location. Flat fan spray nozzles are generally used for dust prevention, but not for suppression of airborne dust.

Hydraulic fine spray nozzles provide a hollow cone pattern of very small droplets compared to other spray nozzles. Hydraulic fine spray nozzles can be used for airborne dust suppression. Hydraulic fine spray nozzles have comparatively small orifices and are prone to plugging.

Air atomizing spray nozzles are available in several spray patters (e.g., hollow cone, full cone, flat, etc.) and provide very small drops compared to other non-hydraulic fine spray nozzles. Air atomizing spray nozzles can be used for airborne dust suppression. Air atomizing spray nozzles generally comprise exceedingly small orifices and rely upon compressed air to drive liquid through the orifices. Generally, air atomizing nozzles require more maintenance than other types of spray nozzles.

The foregoing may be better understood by reference to the following example, which is presented for the purpose of illustration and is not intended to limit the scope of the invention.

EXAMPLE

Two surfactants were used in this example. One surfactant was based on nonionic ethoxylated nonyl phenol (colorless liquid, pH 4.1, viscosity 135 cPs at 23° C., and specific gravity of 1.01) and the other was a mixture of multiple nonionic and anionic surfactants, including linear dodecyl benzene sulfonic acid, sodium laureth sulfate, ethyoxylated alcohol, and α-olefin sulfonate and water (odorless yellow liquid, pH 7.8, viscosity 1400 cPs at 24° C., and specific gravity of 1.03). These two surfactants were mixed with water, each in beakers (static mixing) and each via a Koflo Model 3/8-40C-4-12-2 static inline mixer, and at varied concentrations. Mixing in beakers was accomplished by adding a known mass of each surfactant composition to a known amount of water, and the concentrations were predetermined. When utilizing the inline mixer, varied amounts of surfactant were introduced immediately upstream of the inlet of the inline mixer. Water flow was maintained at 1 gal (3.875 L) per min. Each surfactant composition was added individually to a water stream (e.g., a stream of aqueous liquid) at mass concentrations ranging from 0.01 to 0.051%. For the inline mixing examples, the dust suppressant was collected multiple times at each concentration to ensure homogeneity was achieved.

A Wilhelmy plate tensiometer was used to measure surface tension of each of the dust suppressants formed. The dust suppressants formed via the inline mixer were collected at the outlet of the inline mixer. Table I shows the surface tension data at various surfactant concentrations. Surface tension of water is about 72 dyne/cm. With surfactant addition, surface tension reduces until it reaches a plateau, commonly known as critical micelle concentration ("CMC"), when surface tension remains fairly constant with further surfactant addition. As shown by the data, inline mixing resulted in the CMC being achieved even at 0.01% surfactant concentration, which assures homogeneous mixing was achieved.

TABLE I

| Mass percent of ethoxylated nonyl phenol based surfactant composition in dust suppressant | Surface tension, dyne/cm | Mass percent of a mixture of surfactant composition in dust suppressant | Surface tension, dyne/cm |
|---|---|---|---|
| Static mixing | | | |
| 0 | 70.4 | 0 | 70.4 |
| 0.010 | 32.1 | 0.007 | 41.2 |
| 0.016 | 31.2 | 0.017 | 34.4 |
| 0.022 | 29.7 | 0.022 | 33.4 |
| 0.028 | 28.2 | 0.027 | 33.4 |
| 0.043 | 29.7 | 0.034 | 33.7 |
| In-line mixing | | | |
| 0 | 72.4 | 0 | 72.4 |
| 0.010 | 39.3 | 0.010 | 28.8 |
| 0.021 | 32.3 | 0.021 | 29.3 |
| 0.036 | 30.3 | 0.036 | 29.7 |
| 0.051 | 30.3 | 0.051 | 26.7 |

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of suppressing dust from a mined product or a seam, the method comprising:
    obtaining an aqueous liquid stream comprising one or more of tap water, well water, pond water, river water, runoff, or recycled water from an industrial process;
    forming an aqueous dispersion stream by delivering a surfactant composition to the aqueous liquid stream;
    mixing the aqueous dispersion stream to form a dust suppressant;
    measuring a surface tension of the dust suppressant via a tensiometer;
    relaying the measured surface tension to a controller;
    adjusting the forming of the aqueous dispersion stream according to the measured surface tension relayed to the controller; and
    dispensing a mist of the dust suppressant to a surface of a mined product or a seam, wherein the dispensed mist comprises a mean droplet size of about 0.1 µm to about 100 µm.

2. The method of claim 1, wherein the dust suppressant has a measured surface tension of from about 20 dynes per centimeter to about 45 dynes per centimeter.

3. The method of claim 1, wherein a main flow of the dust suppressant contacts the tensiometer.

4. The method of claim 3 further comprising stopping the main flow and measuring the surface tension of the dust suppressant while the main flow is stopped.

5. The method of claim 1, wherein measuring a surface tension of the dust suppressant via a tensiometer comprises: diverting a side stream of the dust suppressant from a main flow of the dust suppressant, contacting the side stream with the tensiometer; stopping a flow of the side stream; and measuring the surface tension of the side stream while the flow of the side stream is stopped.

6. The method of claim 5, wherein the measuring of the surface tension of the side stream is measuring at atmospheric pressure.

7. The method of claim 1, wherein the mined product comprises particulate matter comprising at least one of mineral, coal, ore, dirt, clay, limestone, salt, tailings, and processed matter thereof.

8. The method of claim 1, wherein the mixing is performed via at least one of a stirred tank, an inline mixer, turbulent flow created inside a conduit carrying the aqueous dispersion, and combinations thereof.

9. The method of claim 1, wherein the dust suppressant is dispensed at a pressure of from about 10 psig to about 100 psig.

10. The method of claim 1, wherein the surfactant composition comprises a surfactant selected from the group consisting of: a sulfonate, an alkyl aryl sulfonate, a paraffin sulfonate, an alcohol sulfate, an alcohol ether sulfate, an alkyl carboxylate, an alkyl ether carboxylate, an alkyl phosphate ester, an ethoxylated alkyl phosphate ester, a mono sulfosuccinate, a dialkyl sulfosuccinate, a sulfosuccinate, and combinations thereof.

11. The method of claim 1, wherein the surfactant composition comprises a surfactant selected from the group consisting of: an alkyl trimethyl quaternary ammonium salt, an alkyl dimethyl benzyl quaternary ammonium salt, a dialkyl dimethyl quaternary ammonium salt, an imidazolinium salt, and combinations thereof.

12. The method of claim 1, wherein the surfactant composition comprises a surfactant selected from the group consisting of: an alcohol alkoxylate, an alkylphenol alkoxylate, a block copolymer of ethylene oxide, a block copolymer of propylene oxide, a block copolymer of butylene oxide, an alkyl dimethyl amine oxide, an alkyl-bis(2-hydroxyethyl) amine oxide, an alkyl amidopropyl dimethyl amine oxide, an alkylamidopropyl-bis(2-hydroxyethyl) amine oxide, an alkyl polyglucoside, a polyalkoxylated glyceride, a sorbitan ester, a polyalkoxylated sorbitan ester, an alkoyl polyethylene glycol ester, an alkoyl polyethylene glycol diester, a betaine, a sultane, and combinations thereof.

13. The method of claim 1, wherein the surfactant composition comprises a surfactant selected from the group consisting of: an alkyl amphoacetate, an alkyl amphodiacetate, an alkyl amphopropipionates, an alkyl amphodipropionates, an alkyl alkyliminodiproprionate, and combinations thereof.

14. The method of claim 1, wherein the surfactant composition comprises at least one of $C_{14-16}$ alpha olefin sulfonate and sodium dodecyl benzene sulfonate.

15. The method of claim 1, wherein the dust suppressant is dispensed via at least one spray nozzle.

* * * * *

UNITED STATES PATENT AND TRADEMARK OFFICE
CERTIFICATE OF CORRECTION

PATENT NO. : 10,927,280 B2
APPLICATION NO. : 15/343501
DATED : February 23, 2021
INVENTOR(S) : Kevin O'Brien et al.

Page 1 of 1

It is certified that error appears in the above-identified patent and that said Letters Patent is hereby corrected as shown below:

Column 17, Claim 13, Line 6, "amphopropripionates," should be -- amphopropionates, --

Column 17, Claim 13, Line 7, "alkyliminodiproprionate," should be -- alkyliminodipropionate, --

Signed and Sealed this
First Day of June, 2021

Drew Hirshfeld
*Performing the Functions and Duties of the*
*Under Secretary of Commerce for Intellectual Property and*
*Director of the United States Patent and Trademark Office*